3,825,472
METHOD OF PRODUCING L-LYSINE
BY FERMENTATION
Koji Kubota and Yasuhiko Yoshihara, Kawasaki, Hayao Hirakawa, Yokohama, Hirotaka Kamijo, Kawasaki, Shigeki Nosaki, Isehara, Fumihiro Yoshinaga, Fujisawa, and Shinji Okumura and Hiroshi Okada, Tokyo, Japan, assignors to Ajinomoto Co., Inc., Tokyo, Japan
No Drawing. Continuation-in-part of abandoned application Ser. No. 353,635, Apr. 23, 1973. This application Oct. 2, 1973, Ser. No. 402,818
Claims priority, application Japan, Apr. 27, 1972, 47/42,527; Aug. 18, 1972, 47/82,641; Sept. 19, 1972, 47/94,030; Nov. 30, 1972, 47/120,247
Int. Cl. C12d 1/00
U.S. Cl. 195—29
9 Claims

ABSTRACT OF THE DISCLOSURE

Artificially induced mutants of *Brevibacterium lactofermentum, Corynebacterium glutamicum, Corynebacterium lilium*, and *Corynebacterium acetoacidophilum* which resist feedback inhibition by S-(2-aminoethyl)-cysteine and require at least one supplemental nutrient which is herine, proline, alanine, nicotinamide, nicotinic acid, pantothenic acid, thiamine, guanidine, adenine, hypoxanthine, or vitamin $B_{12}$ produce L-lysine by fermentation of otherwise conventional culture media in higher yields than the parent strains lacking the nutrient requirement.

---

This application is a continuation-in-part of our copending application, Ser. No. 353,635, filed on Apr. 23, 1973, and now abandoned.

This invention relates to the production of L-lysine, and particularly to a method of producing L-lysine by bacterial fermentation.

L-Lysine has been produced heretofore by fermentation relying on three types of bacteria. The first type requires for its growth amino acids related to the biosynthesis of L-lysine and is exemplified by a homoserine-requiring mutant of *Micrococcus glutamicus* disclosed in Pat. No. 2,979,439. The second type includes threonine- or methionine-sensitive mutants and mutants whose growth is inhibited by low concentrations of threonine or methionine, but which require threonine for their growth (French Patents No. 1,533,688). The third type is characterized by resistance to S-(2-aminoethyl)-L-cysteine (AEC) which is a sulfur analogue of L-lysine, as disclosed in Pat. No. 3,707,441.

We now have found that L-lysine is produced at higher concentrations than were available heretofore under comparable conditions by mutants which combine resistance to feedback inhibition by lysine or lysine analogues with a requirement for at least one specific nutrient which is serine, proline, alanine, nictoinamide, nicotinic acid, pantothenic acid, thiamine, guanidine, adenine, hypoxanthine, or vitamin $B_{12}$ when these mutants are cultured on otherwise conventional media including sources of assimilable carbon and nitrogen, inorganic ions, and unspecific organic growth promoting agents.

The mutants of the invention are derived by means of conventional mutagenic agents from parent strains of the genera Brevibacterium and Corynebacterium, and by screening of the mutants so produced for the necessary resistance to feedback inhibition by lysine and its analogues, such as AEC in concentrations of 1 mg./ml. or more, and a requirement for one of the nutrients enumerated above. Because of their resistance to lysine analogues, the mutants of the invention produce lysine at a predictable rate and in predictable amounts without being seriously affected by variations in the amounts of threonine and other organic nutrients in the fermentation medium employed.

The latter thus may be a natural nutrient medium or a synthetic nutrient medium providing the basic needs of the microorganisms of the invention together with the specific organic nutrient or nutrients of the group enumerated above.

Suitable carbon sources include the usual carbohydrates, such as glucose, fructose, maltose, sucrose, starch, starch hydrolyzate, molasses, also organic acids, particularly acetic acid, propionic acid, or fumaric acid, and alcohols, particularly methanol and ethanol, and a medium may contain several different carbon sources. Some of the new mutants assimilate hydrocarbons as a major or minor carbon source.

Nitrogen may be supplied by ammonium salts, nitrates, urea, amino acids, cornsteep liquor, yeast extract, meat extract, fish meal, peptone, bouillon, casein hydrolyzates, and mixtures thereof, and also by ammonia.

Necessary inorganic ions may be provided by magnesium sulfate, sodium phosphate, potassium mono- and dihydrogen phosphate, iron sulfate, manganese chloride, calcium chloride, sodium chloride and others.

The specific nutrients required by the mutants of the invention and enumerated above may be provided in the form of natural products containing the same, and simple derivatives of natural products, such as soybean protein hydrolyzate, yeast extract, cornsteep liquor, peptone, casein hydrolyzate, and the like. The specific nutrients must be held at a relatively low concentration, generally below the concentration producing optimum growth, and to be determined experimentally for each nutrient and each mutant strain, the phenomenon being well known in itself.

The fermentation is carried out in a temperature range between 24° and 37° C., and maximum lysine concentrations are generally reached after 24 to 96 hours of culturing under aerobic conditions maintained by agitation and/or aeration. The pH value of the medium should be controlled between 5 and 9 by additions of calcium carbonate, ammonia, organic or inorganic acids, as may be required.

Conventional methods may be used for recovering the accumulated lysine from the culture broth, preferably after removal of the microbial cells by filtration or centrifuging. Cation exchange resins conveniently absorb lysine from the cell free broth. The lysine concentration in the culture broth may be monitored by means of lysine decarboxylase, and the product is readily identified by paper chromatography.

The following Examples are further illustrative of this invention.

EXAMPLE 1

Cells of *Brevibacterium lactofermentum* ATCC 13869 were irradiated with X-rays to induce mutation, and cultured thereafter in a complete agar flat plate at 31° C. for 4–10 days. Four mutant strains were isolated by the replica method from colonies apearing on the plate according to specific nutrient requirements for serine, pantothenic acid, thiamine, and guanine or adenine, which were determined by standard methods known in the art.

The four strains so obtained were each treated with 200 µg./ml. nitrosoguanidine at 30° C. for 30 minutes, and inoculated on agar flat plates containing 2 g./dl. glucose, 0.3 g./dl. urea, 0.5 g./dl. threonine, 0.1 g./dl. $KH_2PO_4$, 0.04 g./dl. $MgSO_4 \cdot 7H_2O$, 2 p.p.m. $Fe^{++}$, 2 p.p.m. $Mn^{++}$, 50 µg./l. biotin, 100 µg./l. thiamine, 500 µg./ml. AEC, 2 g./dl. agar, and, respectively, 30 mg./dl. serine, 10 mg./l. calcium pantothenate, and 100 mg./l. adenine for the three strains requiring these nutrients.

The four cultures were adjusted to pH 7.0 and cultured at 31° C. for 4 to 10 days. The colonies appearing on the plates were tested for their lysine-producing ability and the following four strains were isolated:

B. lactofermentum Y-108 (ATCC 21798; FERM P-1443)
B. lactofermentum AC-73 (ATCC 21799; FERM P-1444)
B. lactofermentum AD-5 (ATCC 21800; FERM P-1445)
B. lactofermentum AD-162 (ATCC 21801; FERM P-1446).

The parent strain B. lactofermentum ATCC 13869 and the four mutants were cultured 24 hours at 31° C. with shaking on a minimal medium of 2 g./dl. glucose, 1 g./dl. ammonium sulfate, 0.3 g./dl. urea, 0.1 g./dl. $KH_2PO_4$, 0.04 g./dl. $MgSO_4.7H_2O$, 2 p.p.m. $Fe^{++}$, 2 p.p.m. $Mn^{++}$, 50 μg./l. biotin, and 200 μg./l. thiamine hydrochloride. In parallel control tests, the four mutants were grown on respective modified media differing from the minimal medium by an addition of 30 mg./dl. serine (Y-108), an addition of 10 mg./l. calcium pantothenate (AC-73), the absence of thiamine hydrochloride (AD-5), and the addition of 100 mg./l. adenine (AD-162).

Each cultured broth was diluted with 25 volumes of water, and its optical density was determined as a measure of growth by measuring light absorbancy at 562 mμ. The results are listed in Table 1.

TABLE 1

| Brevibacterium lactofermentum | Optical density | |
|---|---|---|
| | Minimal medium | Modified medium |
| ATCC 13869 | 0.400 | |
| Y-108 | 0.065 | 0.410 |
| AC-73 | 0.059 | 0.405 |
| AD-5 | 0.380 | 0.075 |
| AD-162 | 0.052 | 0.375 |

EXAMPLE 2

B. lactofermentum ATCC 13869 was treated with 250 μg./ml. nitrosoguanidine at 30° C. for 30 minutes, inoculated on an agar plate containing 2 g./dl. glucose, 0.3 g./dl. urea, 1 g./dl. ammonium sulfate, 0.5 g./dl. threonine, 0.1 g./dl. $KH_2PO_4$, 0.04 g./dl. $MgSO_4.7H_2O$, 2 p.p.m. $Fe^{++}$, 2 p.p.m. $Mn^{++}$, 50 μg./l. biotin, 200 μg./l. thiamine.HCl, 5 mg./ml. AEC, and 2 g./dl. agar, at pH 7.0. After 4 to 10 days culturing at 31° C., AEC resistant strains were isolated from the colonies appearing on the cultured agar plate, and mutants capable of producing L-lysine were selected. They had no specific nutrient requirements and were further subjected to nitrosoguinidine treatment as above, and the following six mutants resistant to AEC and capable of producing lysine in high yields were isolated:

B. lactofermentum AJ-3391 (FERM P-1570)
B. lactofermentum AJ-3392 (FERM P-1571)
B. lactofermentum AJ-3393 (FERM P-1572)
B. lactofermentum AJ-3394 (FERM P-1573)
B. lactofermentum AJ-33995 (FERM P-1574)
B. lactofermentum AJ-3396 (FERM P-1575)

They were cultured as in Example 1 on a minimal medium at pH 7.2 and in respective modified media additionally containing 40 mg./dl. proline (AJ-3391), 0.5 mg./dl. nicotinamide and 40 mg./dl. leucine (AJ-3392), 50 mg./dl. serine and 40 mg./dl. leucine (AJ-3393), 10 μg./dl. vitamine $B_{12}$ (AJ-3394), 1 mg./dl. nicotinamide (AJ-3395), and 5 mg./dl. hypoxanthine (AJ-3396).

The growth of the several strains was measured in terms of optical density of the diluted broth as in Example 1 with the results shown in Table 2.

TABLE 2

| Brevibacterium lactofermentum | Optical density | |
|---|---|---|
| | Minimal medium | Modified medium |
| AJ-3391 | 0.058 | 0.440 |
| AJ-3392 | 0.057 | 0.420 |
| AJ-3393 | 0.052 | 0.460 |
| AJ-3394 | 0.058 | 0.390 |
| AJ-3395 | 0.055 | 0.430 |
| AJ-3396 | 0.059 | 0.420 |

EXAMPLE 3

Mutation was induced in B. lactofermentum ATCC 13869 as in Example 2, and an AEC-resistant mutant strain No. 872, capable of producing lysine, was isolated from colonies growing on an agar plate differing from that employed in Example 2 by containing 0.4 g./dl. threonine, 100 μg./l. thiamine.HCl, and 4 mg./ml. AEC. Strain No. 872, which does not require specific nutrients, was subjected to the same mutagenic treatment with nitrosoguanidine, and two mutants combining AEC-resistance with specific nutrient requirements, and capable of producing much L-lysine were isolated:

B. lactofermentum AJ-3424 (FERM P-1711)
B. lactofermentum AJ-3425 (FERM P-1712)

Mutagenic treatment of B. lactofermentum AJ-3424 further produced the lysine producing strain B. lactofermentum AJ-3429 (FERM P-1857).

The nutrient requirements of these three strains were determined or confirmed by inoculation of a minimal medium differing from that described in Example 1 by containing 0.05% NaCl and of modified media additionally containing amino acids and mixtures of amino acids in amounts of 50 mg./dl. per amino acid and/or nicotinamide or nicotinic acid in an amount of 5 mg./l. Optical densities of diluted culture broths were determined as a measure of growth as in the preceding Examples after 24 hours of culturing at 31° C.

The values listed in Table 3 are averages of two runs, and the amino acids identified by their abbreviated names are the naturally occurring L-isomorphs except for D-alanine, specifically identified as D-Ala. Nicotinamide and nicotinic acid are interchangeable and jointly identified as "Nic.".

TABLE 3

| Modifying nutrient | Optical density | | |
|---|---|---|---|
| | AJ-3424 | AJ-3425 | AJ-3429 |
| None | 0.026 | 0.069 | 0.032 |
| L-Ala | 0.168 | 0.173 | 0.032 |
| D-Ala | 0.158 | 0.243 | |
| Leu | | | 0.032 |
| Val | 0.069 | 0.185 | |
| Nic | 0.041 | 0.068 | |
| Thr.+Met | 0.021 | 0.074 | |
| Ala.+Nic | 0.442 | 0.244 | |
| D-Ala.+Nic | 0.495 | 0.344 | |
| Val.+Kic | | 0.318 | |
| Ala.+Leu | | | 0.078 |
| Ala.+Leu.+Nic | | | 0.470 |
| Ala.+Leu.+Nic.+Thr.+Met | | | 0.440 |

EXAMPLE 4

Corynebacterium glutamicum AJ-3463 (FERM P-1987) which resists AEC but has no specific nutrient requirements was derived from Micrococcus glutamicus or Corynebacterium glutamicum ATCC 13032 by the mutation technique described in Example 3, and further mutation of strain AJ-3463 by the same technique produced C. glutamicum AJ-3458 (FERM P-1982), AJ-3460 (FERM P-1984), and AJ-3461 (FERM P-1985) which resist AEC and respectively require proline, guanine, and vitamin $B_{12}$+leucine, as is evident from the following tests of their growth on a medium containing 2 g./dl. glucose, 1 g./dl. ammonium sulfate, 0.1 g./dl. $KH_2PO_4$, 0.04 g./dl. $MgSO_4.7H_2O$, 0.05 g./dl. NaCl, 50 μg./l.

biotin, 200 µg./l. thiamine.HCl, 2 p.p.m. Fe$^{++}$, 2 p.p.m. Mn$^{++}$, and 2 g./dl. CaCO$_3$ at pH 7.0.

The optical density values of diluted broths obtained as in the preceding Examples are listed in Table 4 for the minimal medium described above and for media modified respectively by additions of 40 mg./dl. L-proline (AJ-3458), 5 mg./dl. guanine (AJ-3460), and 0.01 mg./dl. vitamin B$_{12}$ plus 50 mg./dl. L-leucine (AJ-3461). Growth data for the parent strain AJ-3463 in the minimal medium are also listed.

TABLE 4

| Corynebacterium glutamicum | Optical density | |
|---|---|---|
| | Minimal medium | Modified medium |
| AJ-3463 | 0.512 | |
| AJ-3458 | 0.030 | 0.475 |
| AJ-3460 | 0.090 | 0.320 |
| AJ-3461 | 0.075 | 0.300 |

EXAMPLE 5

Using the procedure described in Example 3, *Corynebacterium glutamicum* AJ-3397 (FERM P-1613) and *Corynebacterium lilium* AJ-3464 (FERM P-2026) were obtained by mutation from *Micrococcus glutamicus* ATCC 13032 and *Corynebacterium lilium* NRRL B-2243 (ATCC 15990) respectively whose taxonomical features have been described in Pat. No. 3,087,863. The new mutants resist AEC and respectively require serine and alanine.

Similarly, *Corynebacterium acetoacidophilum* ATCC 13870 yielded a mutant strain *C. acetoacidophilum* AJ-3465 (FERM P-2027) by the method of Example 3. It resists AEC and requires alanine for its growth. *Corynebacterium glutamicum* AJ-3463 (FERM P-1987) was derived in the same manner from *C. glutamicum* ATCC 13032, resists AEC, but does not require specific nutrients for its growth.

The mutant strains produced in the manner of Examples 1 to 5 were employed in the production of lysine as described in the following additional Examples.

The soybean protein hydrolyzate described hereinafter contained 7% total nitrogen, and, per milliliter, 26 mg. serine, 30 mg. proline, 45 mg. leucine, 0.08 mg. nicotinamide, and 0.002 mg. vitamin B$_{12}$. The yeast extract mentioned in the Examples contained 26 mg./g. guanine.

EXAMPLE 6

A basic culture medium containing 10 g./dl. glucose, 5 g./dl. ammonium sulfate, 0.1 g./dl. KH$_2$PO$_4$, 0.04 g./dl. MgSO$_4$.78$_2$O, 2 p.p.m. Fe$^{++}$, 2 p.p.m. Mn$^{++}$, 50 µg/l. thiamine hydrochloride, 50 µg./l. biotin, 1.5 ml./dl. soybean protein hydrolyzate, and 5 g./dl. calcium carbonate, of pH 7.2, was divided into 20 ml. batches. Each batch was further enriched, as indicated below, placed in a 500 ml. shaking flask, and sterilized. The batches were inoculated respectively with the four strains of *B. lactofermentum* derived from strain ATCC 13869 according to Example 1. In addition to the basic ingredients listed above, the medium for strain AC-73 contained 0.1 mg./ml. methionine and 5 mg./ml. calcium pantothenate, and the medium for AD-162 contained 100 mg./l. adenine and 100 mg./l. guanidine.

After 72 hours of cultivation with shaking at 31° C., the amounts of L-lysine, as hydrochloride, accumulated in the broths were 4.1 g. for strain Y-108, 2.5 g./dl. for strain AC-73, 3.0 g./dl. for strain AD-5, and 2.8 g./dl. for strain AD-162.

The cultured broth of strain Y-108 was centrifuged to remove the cells, and one liter of the supernatant was stripped of L-lysine by passage over a column of a cation exchange resin (Amberlite IR-120, H-type). The absorbed L-lysine was eluted with 3% aqueous ammonia, and the eluate was partly evaporated in a vacuum. Hydrochloric acid was added to the concentrate which was then placed in an icebox to precipitate crystalline L-lysine hydrochloride dihydrate in an amount of 30.2 g.

EXAMPLE 7

The four strains of *B. lactofermentum* referred to in Example 6 were inoculated on respective seed culture media each containing 15 g./dl. glucose, 0.3 g./dl. ammonium acetate, 0.1 g./dl. KH$_2$PO$_4$, 0.04 g./dl. MgSO$_4$.7H$_2$O, 2 p.p.m. Fe$^{++}$, 2 p.p.m. Mn$^{++}$, 50 µg./l. biotin, 200 µg./l. thiamine hydrochloride, 1.5 ml./dl. soybean protein hydrolyzate, and 0.5 g./dl. yeast extract, and having a pH of 8.0. The seed cultures were held at 31° C. for 16 hours with stirring and aeration.

Respective 15 ml. inocula of the seed cultures were added to 300 ml. batches of fermentation media containing 3 g./dl. glucose, 0.5 g./dl. ammonium acetate, 0.2 g./dl. urea, 0.1 g./dl. KH$_2$PO$_4$, 0.04 g./dl. MgSO$_4$.7H$_2$O, 2 p.p.m. Fe$^{++}$, 2 p.p.m. Mn$^{++}$, 50 µg./l. biotin, 50 µg./l. thiamine.HCl, 3 ml./dl. soybean protein hydrolyzate, at pH 7.5. The media for *B. lactofermentum* AC-73 additionally contained 5 mg./l. calcium pantothenate, and those for *B. lactofermentum* AD-162 100 mg./l. each of adenine and guanine.

The fermentation mixtures were stirred at 1500 r.p.m. at 31.5° C. and aerated with one volume of air per minute and volume of broth. The pH of each medium was held automatically between 7.2 and 8.0 by additions of a 60% solution of acetic acid containing 0.25 mole ammonium acetate per mole of acetic acid. After 48 hours, it was found that strain Y-108 has produced 6.4 g./dl. lysine, strain AC-73 4.8 g./dl., strain AD-5 5.7 g./dl., and strain AD-162 6.0 g./dl.

EXAMPLE 8

The four strains of *B. lactofermentum* referred to in Examples 6 and 7 were cultured at 31.5° C. for 16 hours with shaking on an aqueous seed culture medium containing 1.5 g./dl. glucose, 0.3 g./dl. urea, 0.1 g./dl. KH$_2$PO$_4$, 0.04 g./dl. MgSO$_4$.7H$_2$O, 2 p.p.m. Fe$^{++}$, 2 p.p.m. Mn$^{++}$, 50 µg./l. biotin, 200 µg./l. thiamine hydrochloride, 1.5 ml./dl. soybean protein hydrolyzate, and 0.5 g./dl. yeast extract, and having a pH of 8.0.

15 ml. Inocula of each seed culture were transferred to 300 ml. batches of a fermentation medium containing 1 g./dl. glucose, 1.5 g./dl. ethanol, 0.5 g./dl. ammonium sulfate, 0.2 g./dl. urea, 0.1 g./dl. KH$_2$PO$_4$, 0.04 g./dl. MgSO$_4$.7H$_2$O, 2 p.p.m. Fe$^{++}$, 2 p.p.m. Mn$^{++}$, 50 µg./l. biotin, 50 µg./l. thiamine hydrochloride, 3 ml./dl. soybean protein hydrolyzate, and having an initial pH of 7.5. The media for strains AC-73 and AD-162 were supplemented as in Example 7.

Each fermentation mixture was stirred at 1500 r.p.m. and 31.5° C. for 48 hours while being aerated with an equal volume of air per minute. The pH was held at 7.0 to 7.5 by means of gaseous ammonia. The ethanol content of each medium was determined by gas chromatography, and the ethanol was replenished whenever residual ethanol fell to about 0.3 g./dl.

L-Lysine hydrochloride was accumulated by strain Y-108 in an amount of 5.5 g./dl., by AC-73 in an amount of 4.4 g./dl., by strain AD-5 in an amount of 5.5 g./dl., and by strain AD-162 in an amount of 5.7 g./dl.

EXAMPLE 9

The six strains of *B. lactofermentum* derived from *B. lactofermentum* ATCC 13869 by the method of Example 2 were cultured on the basic medium of Example 6 which was enriched with soybean protein hydrolyzate at the rate of 3 ml./dl. for AJ-3391, AJ-3394, and AJ-3396, 1.5 ml./dl. for AJ-3392 and AJ-3393, and 2 ml./dl. for AJ-3395, and with 5 mg. hypoxanthine per ml. for strain AJ-3396. Strains AJ-3391 to AJ-3396 produced, in the same order, 2.9, 5.0, 4.6, 3.5, 3.1, and 3.0 g./dl. L-lysine (as the hydrochloride) in 72 hours.

EXAMPLE 10

The six strains of *B. lactofermentum* referred to in Example 9 were cultured on a medium containing acetate ions as the principal carbon source in the manner described in Example 7, the medium of Example 7 being supplemented by 5 mg./ml. hypoxanthine for strain AJ-3396. The lysine concentrations (as lysine hydrochloride) accumulated after 48 hours incubation by the six strains AJ-3391 to AJ-3396 were, in the same order, 5.4, 7.1, 7.0, 6.5, 5.8, and 6.1 g./dl.

The amount of acetic acid consumed in the culture of *B. lactofermentum* AJ-3392 during the 48 hour period amounted to 30% of the initial culture volume, and 56.3 g. L-lysine hydrochloride dihydrate was recovered from one liter of the cell-free culture broth in the manner described in Example 6.

EXAMPLE 11

The fermentation medium described in Example 8, in which ethanol constitutes the principal carbon source, was used as a substrate for the six strains of *B. lactofermentum* referred to in Examples 9 and 10. The medium for strain AJ-3396 was supplemented by 5 mg./dl. hypoxanthine. The amounts of lysine (as lysine hydrochloride) accumulated in the several broths after 48 hours were, in the same order as in the preceding Examples, 5.2, 6.3, 6.5, 6.1, 5.0, and 5.5 g./dl.

In the culture of *B. lactofermenum* AJ-3392, the L-lysine formed corresponded to 27.7% of the ethanol used, and 50.4 g. L-lysine hydrochloride dihydrate was recovered from one liter of the cell-free broth in the manner of Example 6.

EXAMPLE 12

*B. lactofermentum* AJ-3424, AJ-3425 and the parent strain No. 872 were cultured as described in Example 6, but 200 μg./l. thiamine hydrochloride was added to the basic culture medium, and the medium for strains AJ-3424 and No. 872 further was enriched with 1.5 ml./dl. soybean protein hydrolyzate, and 3 ml./dl. soybean protein hydrolyzate was added to the medium for strain AJ-3425.

After 72 hours of culturing, the amounts of L-lysine produced (as the hydrochloride) and the conversion rate of glucose to lysine were respectively 4.4 g./dl. (44%) for AJ-3424, 3.2 g./dl. (32%) for AJ-3425, and only 1.8 g./dl. (18%) for the parent strain No. 872.

EXAMPLE 13

Seed cultures of the three strains referred to in Example 12 were prepared on a medium containing 1.5 g./dl. glucose, 0.3 g./dl. ammonium acetate, 0.1 g./dl. urea, 0.1 g./ld. $KH_2PO_4$, 0.04 g./ld. $MgSO_4 \cdot 7H_2O$, 2 p.p.m., $Fe^{++}$, 2 p.p.m. $Mn^{++}$, 50 μg./l. biotin, 200 μg./l. thiamine hydrochloride, and 2 ml./dl. soybean protein hydrolyzate, at pH 7.5. After 18 hours of culturing at 31° C. with stirring and aerating, 15 ml. inocula of the seed cultures were transferred to 300 ml. batches of sterilized fermentation medium in one liter jar fermentors. Each fermentation medium contained 2 g./dl. glucose, 0.5 g./dl. ammonium acetate, 0.2 g./dl. urea, 0.1 g./dl. $KH_2PO_4$, 0.04 g./dl. $MgSO_4 \cdot 7H_2O$, 2 p.p.m. $Fe^{++}$, 2 p.p.m. $Mn^{++}$, 50 μg./l. biotin, 50 μg./l. thiamine hydrochloride, and 2.5 ml./dl. soybean protein hydrolyzate, and had a pH of 7.5.

Each fermentation mixture was cultured at 31°-33° C. with stirring at 1500 r.p.m. and aeration at a rate of one volume of air per volume of culture medium per minute. The pH of each medium was held at 7.2 to 8.0 by periodic, automatic additions of a 60% acetic acid solution containing 0.25 mole ammonium acetate per mole acetic acid.

The lysine concentration achieved after 55 hours (as hydrochloride) was 7.2 g./dl. for strain AJ-3424, 6.1 g./dl. for AJ-3425, and 4.0 g./dl. for strain No. 872. The amounts of acetic acid consumed were 22%, 24%, and 32% respectively.

EXAMPLE 14

The ammonium acetate in the seed culture medium of Example 13 was replaced by 0.5% ethanol, and 0.3 g./dl. urea was added. *B. lactofermentum* AJ-3424, AJ-3425, and No. 872 were cultured on the modified seed culture medium at 31° C. for 18 hours with stirring and aeration.

A fermentation medium was prepared as in Example 8, but the ammonium acetate was replaced by 1 g./dl. glucose, 1 g./dl. ethanol, and 0.5 g./dl. ammonium sulfate. Respective batches of the fermentation medium were inoculated with the seed cultures and held at pH 7.2-8.2 by introduction of gaseous ammonia. Ethanol was replenished when the amount of residual ethanol in a fermentation medium, as determined by gas chromatography, fell to about 0.3%.

The amounts of L-lysine hydrochloride accumulated in each fermentation medium after 48 hours were 6.6 g./dl. for AJ-3424, 5.6 g./dl. for AJ-3425, and 3.6 g./dl. for No. 872. Based on the ethanol used, the yields were 26%, 20%, and 17% respectively.

EXAMPLE 15

*B. lactofermentum* AJ-3429 was cultured on a bouillon slant and then inoculated on 20 ml. batches of a fermentation medium sterilized in 500 ml. shaking flasks at 110° C. for 5 minutes. The medium contained 10 g./dl. glucose, 4.5 g./dl. ammonium sulfate, 0.1 g./dl. $KH_2PO_4$, 0.04 g./dl. $MgSO_4 \cdot 7H_2O$, 2 p.p.m. $Fe^{++}$, 2 p.p.m. $Mn^{++}$, 50 μg./l. biotin, 200 μg./l. thiamine hydrochloride, 1 ml./dl. soybean protein hydrolyzate, and 5 g./dl. $CaCO_3$, and had an initial pH of 7.0.

After 72 hours of fermentation at 31° C., the broth contained 5.1 g./dl. L-lysine (as the hydrochloride) corresponding to a yield of 51% based on the glucose initially present.

EXAMPLE 16

*C. glutamicum* AJ-3397, AJ-3458, AJ-3460, AJ-3461; *C. lilium* AJ-3464, and *C. acetoacidophilum* AJ-3465 were cultured as in Example 15, except for an additional 0.5% yeast extract in the medium for *C. glutamicum* AJ-3460. *C. glutamicum* AJ-3463 was cultured in the same manner as a control which lacks a nutrient requirement.

In the order in which the microorganisms are listed in the preceding paragraph, they produced 3.0, 3.0, 4.1, 3.1, 2.9, 3.2, and 2.0 g./dl. L-lysine (as hydrochloride). On the basis of 10 g./dl. glucose in the initial medium, 3.0 g./dl. lysine correspond to a yield of 30%.

EXAMPLE 17

The six microorganisms of the invention mentioned in Example 16 were cultured in a medium containing acetate ions as the principal carbon source, substantially as described in Example 7, but with an additional 0.5% yeast extract in the seed culture medium whose pH was adjusted to 7.0. The fermentation medium contained an additional 2.5 ml./dl. soybean protein hydrolyzate.

After 55 hours of cultivation, the media on which the six microorganisms had been cultured contained, in the order indicated in Example 16, 5.0, 5.2, 4.7, 6.4, 5.5, and 5.8 g./dl. lysine (as the hydrochloride), and the acetic acid consumption was, in the same order, 22%, 23.5% 25%, 23%, 24%, and 22%.

EXAMPLE 18

*C. glutamicum* AJ-3397, *C. lilium* AJ-3464, and *C. acetoacidophilum* AJ-3465 were inoculated on respective batches of a seed culture medium and cultured at 31° C. for 18 hours with stirring and aeration. The medium contained 1.5 g./dl. glucose, 0.3 g./dl. urea, 0.1 g./dl. $KH_2PO_4$, 0.04 g./dl. $MgSO_4 \cdot 7H_2O$, 2 p.p.m. $Fe^{++}$, 2 p.p.m. $Mn^{++}$, 50 μg./l. biotin, 200 μg./l. thiamine hydrochloride, and 1.5 ml./dl. soybean protein hydrolyzate. It had an initial pH of 7.5.

300 ml. Batches of a fermentation medium were placed in one liter glass jar fermentors, sterilized, and inoculated with respective 15 ml. portions of the seed cultures. The fermentation medium contained 1 g./dl. glucose, 1 g./dl. ethanol, 0.5 g./dl. ammonium sulfate, 0.2 g./dl. urea, 0.1 g./dl. $KH_2PO_4$, 0.04 g./dl. $MgSO_4 \cdot 7H_2O$, 2 p.p.m. $Fe^{++}$, 2 p.p.m. $Mn^{++}$, 50 µg./l. biotin, 50 µg./l. thiamine hydrochloride, and 2.5 ml./dl. soybean protein hydrolyzate, and had an initial pH of 7.5.

Each fermentation batch was cultured at 31° to 33° C. with stirring and aeration at a rate of one volume of air per minute and volume of broth. A pH of 7.2 to 7.8 was maintained by introducing gaseous ammonia. Ethanol was replenished whenever the residual ethanol in a medium, as determined by gas chromatography, dropped to about 0.3%.

After 48 hours of cultivation, the three microorganisms had produced 4.8, 4.1, and 4.6 g./dl. L-lysine respectively (as hydrochloride) and had converted ethanol into L-lysine at respective yields of 23%, 20.5%, and 24%.

The microorganisms identified in this specification and the appended claims by accession numbers preceded by ATCC are freely available from the American Type Culture Collection in Rockville, Maryland, and those identified by accession numbers preceded by FERM P are equally available from the Fermentation Research Institute, Agency of Industrial Science and Technology, the Ministry of Industrial Trade and Industry, Chiba-shi, Japan.

What is claimed is:
1. A method of producing L-lysine which comprises:
   (a) culturing a lysine-producing microorganism of genus Brevibacterium or Corynebacterium under aerobic conditions in an aqueous medium containing sources of assimilable carbon and nitrogen, inorganic salts, and minor organic nutrients necessary for the growth of said microorganism, at pH 5 to 9 until lysine accumulates in said medium,
      (1) said microorganism resisting feedback inhibition by lysine and lysine analogues, and
      (2) said microorganism requiring at least one minor organic nutrient selected from the group consisting of serine, proline, alanine, nicotinamide, nicotinic acid, pantothenic acid, thiamine, guanine, adenine, hypoxanthine, and vitamin $B_{12}$; and
   (b) recovering the accumulated lysine.

2. A method as set forth in claim 1, wherein said microorganism resists feedback inhibition by S-(2-aminoethyl)-L-cysteine.

3. A method as set forth in claim 2, wherein said microorganism is an artifically induced mutant of *Brevibacterium lactofermentum*, *Corynebacterium glutamicum*, *Corynebacterium lilium*, or *Corynebacterium acetoacidophilum*.

4. A method as set forth in claim 3, wherein said microorganism is a strain of *Brevibacterium lactofermentum*.

5. A method as set forth in claim 4, wherein said strain is *Brevibacterium lactofermentum* ATCC 21798, ATCC 21799, ATCC 21800, ATCC 21801, FERM P-1570, FERM P-1571, FERM P-1572, FERM P-1573, FERM P-1574, FERM P-1575, FERM P-1711, FERM P-1712, or FERM P-1857.

6. A method as set forth in claim 3, wherein said microorganism is a strain of *Corynebacterium glutamicum*.

7. A method as set forth in claim 6, wherein said strain is *Corynebacterium glutamicum* FERM P-1613, FERM P-1982, FERM P-1984, or FERM P-1985.

8. A method as set forth in claim 3, wherein said microorganism is *Corynebacterium lilium* FERM P-2026.

9. A method as set forth in claim 3, wherein said microorganism is *Corynebacterium acetoacidophilum* FERM P-2027.

References Cited

UNITED STATES PATENTS

| 3,708,395 | 1/1973 | Nakayama et al. | 195—29 |
| 3,707,441 | 12/1972 | Shiio et al. | 195—28 R |
| 3,711,374 | 1/1973 | Tanaka et al. | 195—28 R |

A. LOUIS MONACELL, Primary Examiner

R. J. WARDEN, Assistant Examiner

U.S. Cl. X.R.
195—28, 30, 47